US006627848B2

(12) United States Patent
Boehnlein

(10) Patent No.: US 6,627,848 B2
(45) Date of Patent: Sep. 30, 2003

(54) GUIDE DEVICE FOR ELECTRIC ARC TORCH WELDING

(75) Inventor: Lawrence A. Boehnlein, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/268,584

(22) Filed: Oct. 10, 2002

(65) Prior Publication Data

US 2003/0034337 A1 Feb. 20, 2003

Related U.S. Application Data

(63) Continuation of application No. 09/827,218, filed on Apr. 6, 2001, now abandoned.

(51) Int. Cl.$^7$ .................................................. B23K 9/00
(52) U.S. Cl. .................................. 219/124.22; 219/136
(58) Field of Search ........................... 219/136, 137.31, 219/137.42, 137.43, 124.22, 74

(56) References Cited

U.S. PATENT DOCUMENTS

| 2,790,925 A | | 4/1957 | Landis et al. | |
|---|---|---|---|---|
| 2,845,524 A | * | 7/1958 | Morley, Jr. et al. | 219/127 |
| 4,333,001 A | | 6/1982 | Nakahama et al. | |
| 4,521,669 A | | 6/1985 | Porter et al. | |
| 4,871,895 A | * | 10/1989 | Preston | 219/99 |
| 5,147,997 A | * | 9/1992 | Haberman | 219/121.5 |
| 5,384,447 A | | 1/1995 | Raloff et al. | |

FOREIGN PATENT DOCUMENTS

| JP | 4-319074 | * 11/1992 | ........... B23K/9/127 |
|---|---|---|---|
| JP | 2000-000672 | * 1/2000 | ............ B23K/9/28 |

* cited by examiner

Primary Examiner—M. Alexandra Elve
Assistant Examiner—Kevin P. Kerns
(74) Attorney, Agent, or Firm—Fay, Sharpe, Fagan, Minnich & McKee

(57) ABSTRACT

A guide device for an electric arc torch having an insulator surrounding a contact tip through which a welding wire extends includes a sleeve having a first end for receiving the insulator and a second end through which the welding wire extends and which second end includes an edge and/or rib for engaging a workpiece and spacing the contact tip therefrom and an opening for viewing the wire, arc and weld puddle.

85 Claims, 2 Drawing Sheets

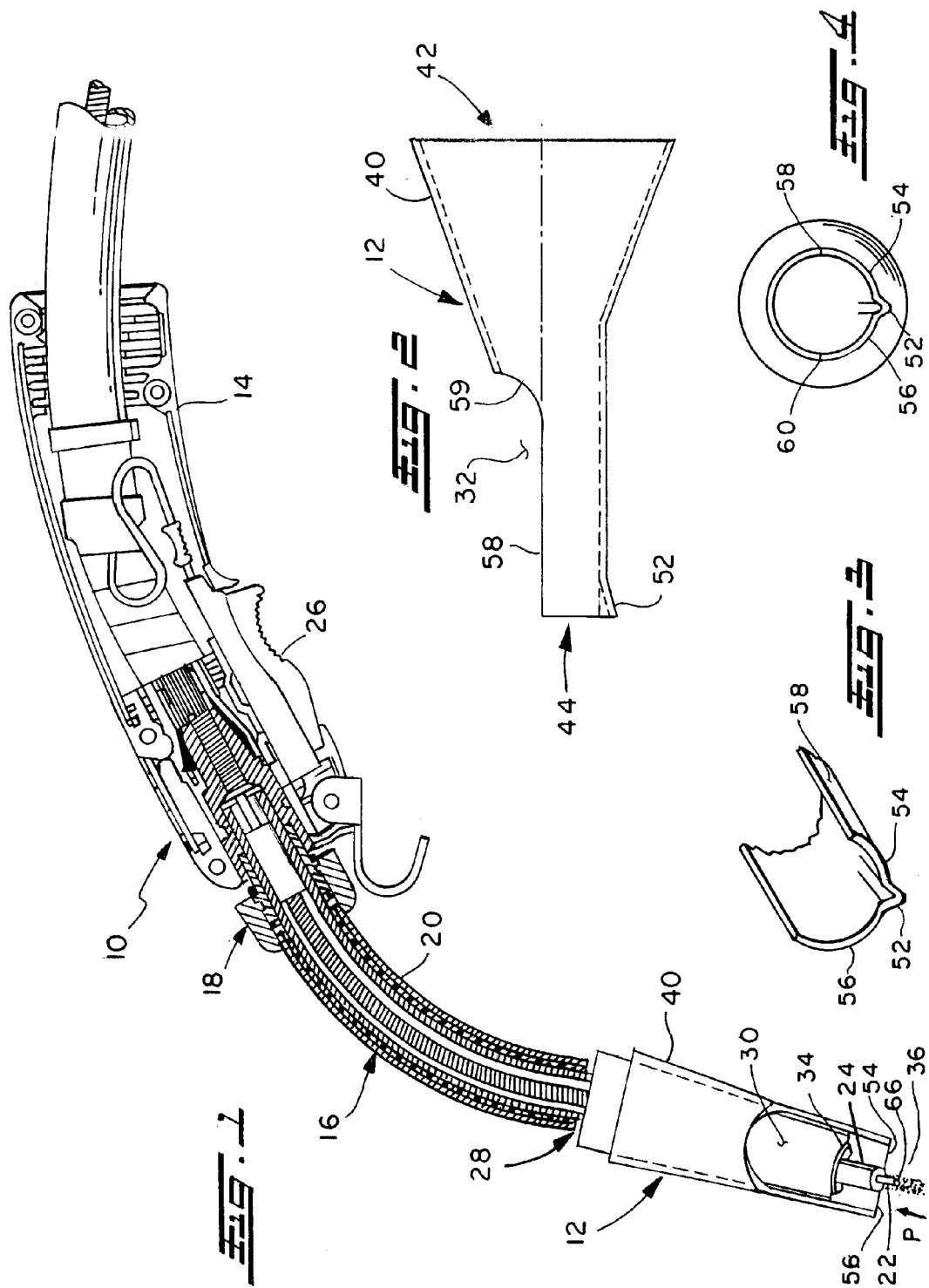

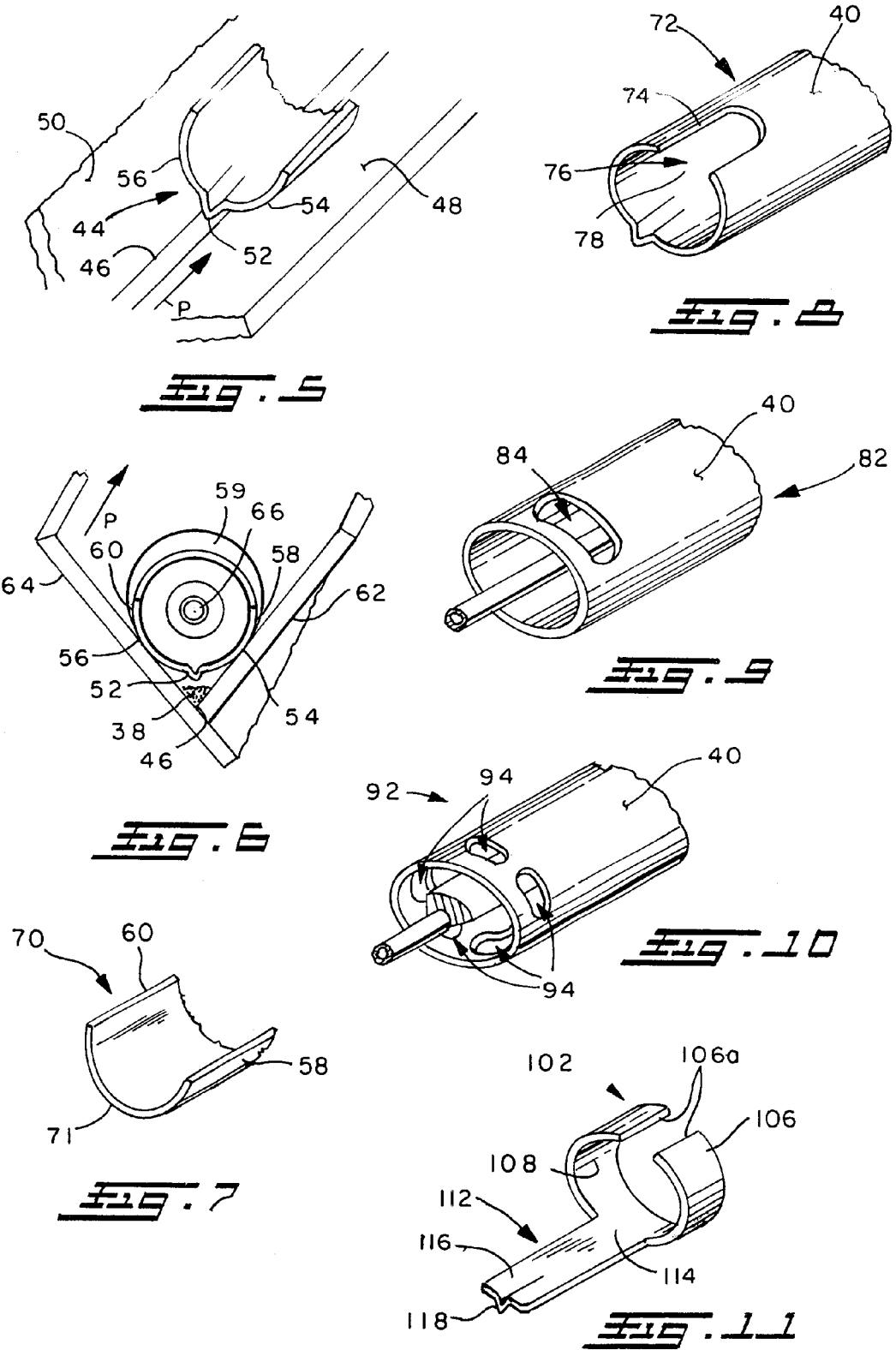

GUIDE DEVICE FOR ELECTRIC ARC TORCH WELDING

The patent application is continuation of U.S. patent application Ser. No. 09/827,218 filed on Apr. 6,2001 now abandoned. The present invention relates to the art of welding, and more specifically to a welding guide for an electric arc welding gun or torch.

The present invention relates to the art of welding, and more specifically to a welding guide for an electric arc welding gun or torch.

While the present invention finds particular utility in connection with a guide for use with an electric arc welding gun and, accordingly, will be described in detail herein in connection with such use, those skilled in the art will recognize that the invention may have other applications and could be utilized, for example, in welding operations that use other kinds of torches.

BACKGROUND OF THE INVENTION

Welding processes are widely used in modem day manufacturing. One such welding process is commonly referred to as arc welding, which utilizes an electrical current and a welding wire. In many instances, arc welding is achieved through the use of a welding gun which facilitates manipulation of the welding wire by a workman during welding. The following patents are incorporated herein by reference as background information with regard to such electric arc welding guns: U.S. Pat. No. 5,384,447 to Raloff, et al.; and U.S. Pat. No. 2,790,925 to Landis, et al.

One example of an arc welding gun of the prior art is shown in the aforementioned patent to Raloff et al. and, generally, comprises a handle member connected to an end of a composite cable which delivers arc power from a suitable source. The welding gun, although comfortable to hold, requires the operator to support the entire weight of the welding gun. In addition, most welding situations require the operator to manually maintain a constant distance between welding wire and workpiece. Other factors, such as welding wire feed rate and welding wire extension also must be considered and controlled during the welding process. This is necessary to achieve a balance between the melting and welding wire core materials in order to produce the desired weld bead. Maintaining control and consistency of the aforementioned welding variables is extremely difficult for the novice welder and/or the experienced welder encountering awkward welding positions.

Another variable that has an effect on welding performance is the welding wire angle. The welding wire angle can be used to control the weld pool. In this respect, for example, by tipping the welding wire at an angle opposite to the direction of travel, known as the drag angle, the arc force can be used to counteract the force of gravity which tends to cause the molten weld pool to run ahead of the arc. The drag angle is the angle between the welding wire center line and the seam center line in the direction of travel. Positioning of the welding wire is critical to ensure good weld bead shapes. For each welding situation, a prescribed drag angle is recommended depending upon the thickness and type of materials to be welded.

Additionally, horizontal fillet welds commonly found on lap welds require that the electrode point at the bottom plate in a manner such that the angle between the electrode and bottom plate is less than 45°. This angle is commonly referred to as the welding wire-to-joint angle. The novice welder has a difficult time in attempting to maintain a consistent drag angle and welding wire-to-joint angle. In addition, the experienced welder encountering difficult welding situations may also find it difficult to maintain consistent angles.

Performance characteristics of electric arc welding include such operational features as welding position capability, deposition rate, penetration, slag covering, and weld spatter. Welding position capability is influenced by weld puddle size, slag volume, electrode diameter, and current capacity. Control of many of these operational features requires the operator to continuously observe the position of the welding gun and welding wire relative to the workpiece.

Another variable critical to ensuring good weld bead shapes is travel speed along the workpiece. Travel speed is necessary to handle the molten metal and slag to produce a desired weld size. Uniformity of travel speed is important. It is accomplished in part by maintaining a uniform distance between the welding wire and the molten slag behind the wire. The novice welder at times will find it difficult to maintain a uniform travel speed throughout the welding operation. Likewise, the experienced welder may find it difficult to maintain uniform travel speed where the welding position is awkward.

Because of the aforementioned characteristics, among others, it is desirable to provide a device which assists the inexperienced welder, as well as the experienced welder, in maintaining desired positions of a welding gun relative to a workpiece during a welding operation while, preferably, enabling viewing of the welding area, thus to optimize controlling the welding variables. The present invention provides such a device.

SUMMARY OF THE INVENTION

The present invention provides an improvement for welding devices of the type described which overcomes the above referred to difficulties and others, and is easy to use. More particularly in this respect, a guide device is provided for the welding end of an electric arc torch having an insulator surrounding a contact tip through which a welding wire extends. The welding guide device is comprised of a sleeve having a first end for receiving the insulator and a second end extending outwardly of the contact tip and through which the welding wire extends. In accordance with one aspect of the invention, the second end includes a portion which is slidable along or between workpieces as the welding torch moves along the welding path. The guide device is structured to slidably engage a workpiece to enable an operator to slide the welding gun along workpieces while maintaining a desired position of the welding gun and welding wire relative to the workpiece. Preferably in this respect, the second end of the welding guide includes a rib on the exterior side and/or an edge which is slidable along or between workpieces, thus allowing the operator to support and slide the welding gun along a welding seam and maintain a straight weld path. Advantageously, the use of the welding guide device for resting the welding gun upon a workpiece also relieves the operator from supporting the entire weight of the welding gun. This reduces operator fatigue and, consequently, improves efficiency of the welding operation. In addition, the welding operator is able to maintain a straight weld path during occasions when maintaining visual contact with the welding arc is difficult or prohibited.

In accordance with another aspect of the invention, the second end of the guide includes a window or opening which allows viewing of the contact tip, welding wire, and welding arc as the operator advances the gun along a weld path. This advantageously optimizes maintaining control over those operational features which require continuous observation during the welding process.

It is accordingly an outstanding object of the present invention to provide a welding guide attachment for a welding gun which assists the inexperienced welder, as well as the experienced welder, in maintaining desired positions of a welding gun relative to a workpiece during a welding operation.

Another object of the present invention is the provision of a guide device of the foregoing character that has a viewing opening in order to enable the operator to maintain visual contact with the welding arc and which facilitates operator inspection of welding wire as it exits the contact tip of a torch and allows an operator to observe welding wire stickout during a welding operation.

Still another object of the present invention is to provide a welding guide of the foregoing character including a guide structure for resting upon a work surface to assist an operator in maintaining desired welding performance conditions such as, for example, constant travel speed, constant drag angle, constant welding wire-to-joint angle, constant distance between welding wire and base metal, and a straight path of travel.

A further object of the invention is the provision of a welding guide device which is simple in construction, economical to manufacture, and easy to install and use.

Still a further object is the provision of a welding guide device of the foregoing character which reduces operator fatigue by eliminating the requirement that the operator support the entire weight of welding gun during a welding operation.

BRIEF DESCRIPTION OF THE DRAWINGS

The invention may take physical form in certain parts and arrangements of parts, preferred embodiments of which will be described in detail in the specification and are illustrated in the accompanying drawings, which form a part hereof and wherein:

FIG. 1 is a plan view, partially in section, of an electric arc welding gun including a welding guide device in accordance with the present invention;

FIG. 2 is an enlarged side elevation view of the guide device shown in FIG. 1;

FIG. 3 is a perspective view of the front end portion of the guide device;

FIG. 4 is a front elevation view of the guide device;

FIG. 5 is a perspective view showing the front end of the guide device engaged in a weld seam;

FIG. 6 is a perspective view showing the front end of the guide device engaging the surfaces of two workpieces;

FIG. 7 is a perspective view of the front end portion of another embodiment of a guide device in accordance with the invention;

FIG. 8 is a perspective view of the front end of yet another embodiment of a guide device in accordance with the invention;

FIG. 9 is a perspective view of the front end of still another embodiment of a guide device in accordance with the invention;

FIG. 10 is a perspective view of the front end of yet another embodiment of a guide device in accordance with the invention; and, FIG. 11 is a perspective view of the front end of another embodiment of a guide device in accordance with the invention.

DESCRIPTION OF PREFERRED EMBODIMENTS OF THE INVENTION

Referring now in greater detail to the drawings, wherein the showings are for the purpose of illustrating preferred embodiments of the invention only, and not for the purpose of limiting the invention. FIG. 1 illustrates a typical electric arc torch 10, which includes a welding guide device 12 in accordance with the present invention secured to the welding end of torch 10, as will be described more fully hereinafter. Several of the common elements of an electric arc torch include, as shown in FIG. 1, a handle 14, a curved body tube 16, a lock nut 18, a liner 20 for the welding wire 22, and a contact tip 24. Body tube 16 is secured to handle 14 by lock nut 18, and liner 20 surrounds welding wire 22 and facilitates the feeding of welding wire 22 to the contact tip 24. A welding operator advances welding wire 22 by pressing a trigger 26 on handle 14 of torch 10. Attached to the distal end 28 of body tube 16 is a welding tip insulator 30.

Welding guide device 12, as shown in FIG. 1, surrounds and is frictionally attached to insulator 30. In the embodiment shown in FIGS. 1–6, guide device 12 includes a sleeve 40, preferably of copper, having a truncated conical rear or first end 42 for receiving insulator 30 and a semicircular front or second end 44 for engaging workpieces and spacing the contact tip 24 from a weld seam 46 therebetween which may be defined, for example, by laterally adjacent coplanar workpieces 48 and 50, as shown in FIG. 5, or by angularly related workpieces, as shown in FIG. 6. In this embodiment, second end 44 includes a radially outwardly projecting V-shaped rib 52 and circumferentially adjacent front edges 54 and 56 from which rib 52 extends axially inwardly of the second end. Guide device 12 assists the welding operator in maneuvering electric arc torch 10 along a weld seam 46 by resting the rib 52 of guide device 12 in and/or on the weld seam as shown in FIG. 5 as the arc torch is moved along path P. As will be appreciated from FIG. 6 of the drawings, front edge portions 54 and 56 engage workpieces 62 and 64, respectively, to support torch 10 as it slides along the workpieces. By resting guide device 12 in each of the aforementioned manners, the welding operator can maintain a consistent distance between the end 66 of welding wire 22 and weld seam 46, a straight weld path P, a consistent drag angle, and a consistent welding wire-to-joint angle as torch 10 is dragged along the workpieces.

Further in accordance with the embodiment shown in FIGS. 1–6, second end 44 of guide device 12 includes an opening 32 which allows a welding operator to view the lower end 34 of insulator 30 and to constantly view contact tip 24, welding wire 22, welding arc 36, and weld bead 38 during movement of torch 10 along the weld path. Opening 32 in this embodiment is defined by cutting away a portion of second end 44 along side edges 58 and 60 and an arcuate edge 59 therebetween.

As will be appreciated from FIGS. 1 and 2 of the drawings and the foregoing description, guide device 12 is frictionally and releasably mounted on insulator 30 without the aid of tools. In this respect, guide device 12 can be frictionally engaged with insulator 30 by pushing guide device 12 onto the insulator until secured thereto. This operation is an easy one-step function. In addition, guide device 12 can be rotated 360° about insulator 30, thus allowing the welding operator to selectively position guide device opening 32 for optimum observation of the welding variables.

FIG. 7 illustrates the front or second end portion of another welding guide device 70 in accordance with the invention. In this embodiment, guide device 70 has a circumferentially continuous semicircular front edge 71 without the inclusion of rib 52 as in the embodiment of FIGS. 1–6. As with rib 52 and front edges 54 and 56 of the earlier embodiment, edge 71 is used to support torch 10 as the welding operator moves the torch along a weld path P.

FIGS. 8, 9, and 10 illustrate the front end of other embodiments of a welding guide device in accordance with the invention. In this respect, the illustrations display guide devices 72, 82, and 92, respectively, in which the guide device opening 32 in the embodiment of FIGS. 1–6 is structurally modified. More particularly, in the embodiment of FIG. 8, the second end of sleeve 40 is cylindrical and the guide opening 74 is defined by an open-ended oval opening cut into the end edge of the sleeve and oriented parallel to the axis of the sleeve. The interior surface 78 of sleeve 40 frictionally engages insulator 30 as the welding operator moves the sleeve towards the distal end 28 of body tube 16. The guide opening 74 includes an open end 76 distal to the torch 10. In the embodiment of FIG. 9, the second end of sleeve 40 is cylindrical and the guide opening 84 is in the shape of an oval cut through the sleeve and oriented perpendicular to the axis of the sleeve. In the embodiment of FIG. 10, the second end of sleeve 40 is cylindrical and the guide opening 94 is defined by five oval shaped openings spaced apart about the second end and oriented perpendicular to the axis of the sleeve. Guide openings 74, 84, and 94 can be arranged in any number of positions about the torch tip such that the welding operator can continuously observe the position of the welding gun 10 and welding wire 22 relative to the workpieces to ensure a desirable weld bead.

FIG. 11 illustrates the front end of yet another embodiment of a welding guide device 102 in accordance with the invention. In the embodiment of FIG. 11, a collar 106 is used for attaching the guide device 102 to the insulator 30. Collar 106 is axially split to provide circumferentially spaced apart opposite ends 106a, and the interior surface 108 of the split collar frictionally engages insulator 30 as the welding operator moves the collar towards the distal end 28 of body tube 16. As shown in FIG. 11, welding guide device 102 also includes a guide plate 112. Guide plate 112 has a first end 114 proximal to collar 106 and a second end 116 distal to collar 106. Preferably, end 114 is integral with collar 106, as shown, but it will be appreciated that the guide plate can be separate from and suitably attached to collar 106. Guide plate 112 at its second end 116 includes a rib 118 similar to rib 52 in the earlier embodiments. Rib 118 on guide plate 112 allows the welding operator to slide guide device 102 along the work surface and thus assists the operator in maintaining appropriate welding variables. Split collar 106 enables the mounting of the guide device on insulator 30 so as to selectively position rib 118 forwardly thereof to provide the welding operator an unobstructed view of the contact tip 24 and welding wire 22.

While considerable emphasis has been placed herein on the structures and structural interrelationships between the component parts of the preferred embodiments of the invention, it will be appreciated that other embodiments, as well as modifications of the embodiments disclosed herein, can be made without departing from the principles of the invention. In this respect, it will be appreciated that the welding guide device can be used with other kinds of torches. Likewise, it will be appreciated that a welding guide device according to the invention can be secured to the insulator in any number of different ways. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation.

Having thus described the invention, it is claimed:

1. A guide device for an electric arc torch having an insulator surrounding a contact tip through which a welding wire extends, said guide device having a longitudinal axis and comprising a sleeve having a first and second portion, said first portion releasably connectable to the insulator, said second portion extending outwardly from said first portion substantially along said longitudinal axis and designed to axially space the insulator from the workpiece during a welding procedure, said second portion including an outer surface and a front end spaced from said first portion, said second portion including a guide rib oriented on d extending outwardly from said outer surface and positioned at least closely adjacent said front end, said guide rib designed to engage a workpiece.

2. The guide device as defined in claim 1, wherein said first portion encircles at least a majority of the insulator when said first portion is positioned on the insulator.

3. The guide device as defined in claim 2, wherein said first portion fully encircles the insulator when said first portion is positioned on the insulator.

4. The guide device as defined in claim 3, wherein said second portion includes an opening designed to partially expose the insulator when said first portion is positioned on the insulator.

5. The guide device as defined in claim 4, wherein said opening begins at and extends axially from said front end.

6. The guide device as defined in claim 5, wherein said second portion includes a plurality of openings.

7. The guide device as defined in claim 6, wherein at least one of said openings is spaced from said front end.

8. The guide device as defined in claim 7, wherein said guide rib has a V-shape.

9. The guide device as defined in claim 8, wherein said guide rib projects downwardly from said front end of said second portion.

10. The guide device as defined in claim 9, wherein said guide rib extends only along a portion of said axial length of said second portion.

11. The guide device as defined in claim 10, wherein said first portion includes a curvilinear cross-sectional shape.

12. The guide device as defined in claim 11, wherein said first portion has a substantially truncated conical shape.

13. The guide device as defined in claim 12, wherein said second portion includes a curvilinear cross-sectional shape.

14. The guide device as defined in claim 13, wherein said second portion includes a substantially U-shape cross-sectional shape.

15. The guide device as defined in claim 11, wherein said first portion includes a substantially C-shaped cross-sectional shape.

16. The guide device as defined in claim 15, wherein said second portion includes a curvilinear cross-sectional shape.

17. The guide device a defined in claim 16, wherein said second portion includes a substantially U-shape cross-sectional shape.

18. The guide device as defined in claim 11, wherein said second portion includes a curvilinear cross-sectional shape.

19. The guide device as defined in claim 11, wherein said second portion includes a substantially straight cross-sectional shape.

20. The guide device as defined in claim 5, wherein said guide rib has a V-shape.

21. The guide device as defined in claim 20, wherein said guide rib projects downwardly from said front end of said second portion.

22. The guide device as defined in claim 21, wherein said guide rib extends only along a portion of said axial length of said second portion.

23. The guide device as defined in claim 22, wherein said first portion includes a curvilinear cross-sectional shape.

24. The guide device as defined in claim 23, wherein said first portion has a substantially truncated conical shape.

25. The guide device as defined in claim 23, wherein said first portion includes a substantially C-shaped cross-sectional shape.

26. The guide device as defined in claim 23, wherein said second portion includes a curvilinear cross-sectional shape.

27. The guide device as defined in claim 26, wherein said second portion includes a substantially U-shape cross-sectional shape.

28. The guide device as defined in claim 23, wherein said second portion includes a substantially straight cross-sectional shape.

29. The guide device as defined in claim 2, wherein said second portion includes an opening designed to partially expose the insulator when said first portion is positioned on the insulator.

30. The guide device as defined in claim 29, wherein said opening begins at and extends axially from said front end.

31. The guide device as defined in claim 30, wherein said first portion includes a curvilinear cross-sectional shape.

32. The guide device as defined in claim 31, wherein said first portion has a substantially truncated conical shape.

33. The guide device as defined in claim 31, wherein said first portion includes a substantially C-shaped cross-sectional shape.

34. The guide device as defined in claim 31, wherein said second portion includes a curvilinear cross-sectional shape.

35. The guide device as defined in claim 34, wherein said second portion includes a substantially U-shape cross-sectional shape.

36. The guide device as defined in claim 31, wherein said second portion includes a substantially straight cross-sectional shape.

37. The guide device as defined in claim 29, wherein said second portion includes a plurality of openings.

38. The guide device as defined in claim 37, wherein at least one of said openings is spaced from said front end.

39. The guide device as defined in claim 38, wherein said guide rib has a V-shape.

40. The guide device as defined in claim 39, wherein said guide rib projects downwardly from said front end of said second portion.

41. The guide device as defined in claim 40, wherein said guide rib extends only along a portion of said axial length of said second portion.

42. The guide device defined in claim 41, wherein said first portion includes a curvilinear cross-sectional shape.

43. The guide device as defined in claim 42, wherein said first portion has a substantially truncated conical shape.

44. The guide device as defined in claim 42, wherein said first portion includes a substantially C-shaped cross-sectional shape.

45. The guide device as defined in claim 42, wherein said second portion includes a curvilinear cross-sectional shape.

46. The guide device as defined in claim 40, wherein said second portion includes a substantially U-shape cross-sectional shape.

47. The guide device as defined in claim 42, wherein said second portion includes a substantially straight cross-sectional shape.

48. The guide device as defined in claim 29, wherein at least one of said openings is spaced from said front end.

49. The guide device as defined in claim 2, wherein said guide rib has a V-shape.

50. The guide device as defined in claim 2, wherein said guide rib projects downwardly from said front end of said second portion.

51. The guide device as defined in claim 50, wherein said guide rib extends only along a portion of said axial length of said second portion.

52. The guide device as defined in claim 2, wherein said first portion includes a curvilinear cross-sectional shape.

53. The guide device as defined in claim 2, wherein said second portion includes a curvilinear cross-sectional shape.

54. The guide device as defined in claim 2, wherein said second portion includes a substantially straight cross-sectional shape.

55. The guide device as defined in claim 1, wherein said second portion includes an opening designed to partially expose the insulator when said first portion is positioned on the insulator.

56. The guide device as defined in claim 55, wherein said opening begins at and extends axially from said front end.

57. The guide device as defined in claim 56, wherein said guide rib has a V-shape.

58. The guide device as defined in claim 57, wherein said guide rib projects downwardly from said front end of said second portion.

59. The guide device as defined in claim 58, wherein said guide rib extends only along a portion of said axial length of said second portion.

60. The guide device as defined in claim 55, wherein said second portion includes a plurality of openings.

61. The guide device as defined in claim 55, wherein at least one of said openings is spaced from said front end.

62. The guide device as defined in claim 55, wherein said guide rib has a V-shape.

63. The guide device as defined in claim 55, wherein said guide rib projects downwardly from said front end of said second portion.

64. The guide device as defined in claim 63, wherein said guide rib extends only along a portion of said axial length of said second portion.

65. The guide device as defined in claim 55, wherein said first portion includes a curvilinear cross-sectional shape.

66. The guide device as defined in claim 55, wherein said second portion includes a curvilinear cross-sectional shape.

67. The guide device as defined in claim 55, wherein said second portion includes a substantially straight cross-section shape.

68. The guide device as defined in claim 1, wherein said guide rib has a V-shape.

69. The guide device as defined in claim 68, wherein said guide rib projects downwardly from said front end of said second portion.

70. The guide device as defined in claim 69, wherein said guide rib extends only along a portion of said axial length of said second portion.

71. The guide device as defined in claim 1, wherein said guide rib projects downwardly from said front end of said second portion.

72. The guide device as defined in claim 71, wherein said guide rib extends only along a portion of said axial length of said second portion.

73. The guide device as claim 1, wherein said guide rib extend only along portion of said length of portion.

74. The guide device defined in claim 1, wherein said first portion includes a curvilinear cross-sectional shape.

75. The guide device as defined in claim 74, wherein said first portion has a substantially truncated conical shape.

76. The guide device as defined in claim 74, wherein said first portion includes a substantially C-shaped shape.

77. The guide device as defined in claim 1, wherein said second portion includes a curvilinear cross-sectional shape.

78. The guide device as defined in claim 77, wherein said second portion includes a substantially U-shape cross-sectional shape.

79. The guide device as defined in claim 1, wherein said second portion includes a substantially straight cross-sectional shape.

80. A guide device for an electric arc torch having an insulator surrounding a contact tip through which a welding wire extends, said guide device having a longitudinal axis and comprising a sleeve having a first and second portion, said first portion releasably connectable to the insulator, said second portion extending outwardly from said first portion substantially along said longitudinal axis and designed to axially space the insulator from the workpiece during a welding procedure, said second portion including a front end spaced from said first portion and a single opening spaced from the front end.

81. A guide device for an electric arc torch having an insulator surrounding a contact tip through which a welding wire extends, said guide device having a longitudinal axis and comprising a sleeve having a first and second portion, said first portion releasably connectable to the insulator, said second portion extending outwardly from said first portion substantially along said longitudinal axis and designed to axially space the insulator from the workpiece during a welding procedure, said second portion including a front end spaced from said first portion and a single opening designed to partially expose the insulator when said first portion is positioned on the insulator, said single opening begins at and extends axially from said front end, said second portion includes a curvilinear cross-sectional shape.

82. The guide device as defined in claim 81, wherein said second portion includes a guide rib oriented on and extending outwardly from an outer surface of said second portion.

83. The guided vice as defined in claim 82, wherein said guide rib is positioned at least closely adjacent said front d of said second portion and is designed to engage a workpiece.

84. A guide device for an electric arc torch having an insulator surrounding a contact tip through which a welding wire extends, said guide device having a longitudinal axis and comprising a sleeve having a first d second portion, said first portion releasably connectable to the insulator, said second portion extending outwardly from said first portion substantially along said longitudinal axis and designed to axially space the insulator from the workpiece during a welding procedure, said second portion including a front end spaced from said first portion and at least one opening designed to partially expose the insulator when said first portion is positioned on the insulator, said at least one opening begins at and extends axially from said front end, said second portion includes a curvilinear cross-sectional shape, said second portion including a guide rib oriented on and extending outwardly from an outer surface of said second portion.

85. The guide device as defined in claim 84, wherein said guide rib is positioned at least closely adjacent said front end of said second portion and is designed to engage a workpiece.

* * * * *